United States Patent [19]

Carpenter, Jr.

[11] 4,389,695
[45] Jun. 21, 1983

[54] EQUIPMENT FOR PROTECTING ELECTRONIC EQUIPMENT AND PERSONNEL AGAINST INADVERTENT OCCURRENCE OF EXTENDED OR TRANSIENT HIGH VOLTAGES AND METHOD

[76] Inventor: Roy B. Carpenter, Jr., 17001 Bracewood Dr., Hacienda Heights, Calif. 91745

[21] Appl. No.: 232,540

[22] Filed: Feb. 9, 1981

[51] Int. Cl.³ ............................................... H02H 9/06
[52] U.S. Cl. ...................................... 361/55; 361/56; 361/91; 361/104
[58] Field of Search ............... 361/56, 58, 55, 91, 361/119, 120, 104, 129; 336/175; 337/17, 18, 31, 32, 33, 34

[56] References Cited

U.S. PATENT DOCUMENTS

| 736,033 | 8/1903 | Stetson | 361/104 |
| 3,631,264 | 12/1971 | Morgan | 361/56 X |
| 3,934,175 | 1/1976 | Clark | 361/56 |

FOREIGN PATENT DOCUMENTS

| 265007 | 12/1926 | Italy | 361/104 |
| 54-138317 | 10/1979 | Japan | 361/91 |
| 1387379 | 3/1975 | United Kingdom | 361/56 |

*Primary Examiner*—Harry E. Moose, Jr.

[57] ABSTRACT

A method and equipment for protecting sensitive equipment against extended duration or transient over-voltages and their hazards. This is accomplished through a high-voltage fusing concept, a fast-acting clamping action and separate grounding points for power and control paths, respectively.

2 Claims, 4 Drawing Figures

EQUIPMENT FOR PROTECTING ELECTRONIC EQUIPMENT AND PERSONNEL AGAINST INADVERTENT OCCURRENCE OF EXTENDED OR TRANSIENT HIGH VOLTAGES AND METHOD

DESCRIPTION OF PRIOR ART

The subjects of this invention are improved systems and elements of equipment utilizing various basic teachings and component parts common to the lightning protection industry and the electronics industry in general to achieve a measure of protection not possible with prior art.

Situations exist within the electronics industry where data or control lines, normally operating at low voltages (usually less than 100 volts) and low current levels (usually less than 1 ampere), are exposed to very high voltages, well into the multi-kilovolt range. These may be limited to relatively short transients or inadvertent over-voltages which extend in duration for periods of up to several hours. The resultant exposure to them causes severe damage and creates a critical personnel hazard. To provide protection for the equipment, the voltage peak must be limited to some value, usually less than 100 volts: to protect personnel the total energy must be limited. No prior art was available to satisfy this combination of requirements in a practical configuration.

Related arts would involve the field of lightning protection and, perhaps safety engineering. The field of lightning protection for this form of circuits has been dominated by suppliers of component parts, such as small gas tubes, zener or avalanche diodes, and varistors of various forms. These are ineffective against the hazard to be dealt with by this invention, since they handle very limited energy levels. Some suppliers have developed several methods of combining a few of these devices to improve the protector's performance. Some of these are covered by U.S. Pat. No. 3,934,175 which is typical of others in concept. These simple combinations have proven effective against the lower energy transients, but are completely ineffective against high energy transients, those in excess of a few hundred joules and the more destructive and dangerous extended duration over-voltages. Safety programs and protection devices are devised to deal with known or expected potentially dangerous voltages; provision for the abnormal or low probability events is often not considered.

Prior art suggested the use of high voltage fusing to attempt to interrupt circuits inadvertently exposed to high voltage. These have proven ineffective because of the slow reaction time, the energy passed through, and the failure to open circuit under some conditions.

SUMMARY OF INVENTION

The subject of this invention is a protective system having the capability of preventing the passage of harmful, destructive or dangerous transients or extended over-voltage conditions to any low voltage data or control line, or other paired or single wire circuit, whether referenced to ground or not.

This invention was developed to provide any electrical circuit or any electronic data line, paired, or single line, referenced to ground, including telephone lines, with a protector that will limit the voltage passed through to a preselected, low and safe value, regardless of the input character and that will permit normal operation during and after the application of lower level transients up to and including those induced by lightning activity, and that will fail open circuit without an arc or without permitting the passage of a destructive or unsafe voltage, even when the input is a low impedance source operating in the multi-kilovolt range.

Another advantage of this invention is its wide range of potential usage. The concept can be adapted for usage in and protection of very sensitive, low voltage electronic circuits, the higher voltage electrical control circuits, or even the high-voltage electrical distribution systems for home and industry.

Another advantage of this invention is flexibility in the installation. It may be used in a single module form or in stacks, forming a junction point or interface assembly between systems, without any other hardware.

Although the principle of this invention applies equally to single data lines, control lines or phase conductors, AC or DC referenced to ground, a neutral or some other reference point, a paired circuit is used to illustrate the concept.

Additional advantages of the subject improvement will become apparent from the following description and the accompanying drawings.

In the drawing forming a part of this application:

FIG. 1 indicates a schematic diagram of the generalized circuit, presenting the type and the preferred mutual placement of the parts required to achieve the herein defined objectives.

Figure 1:
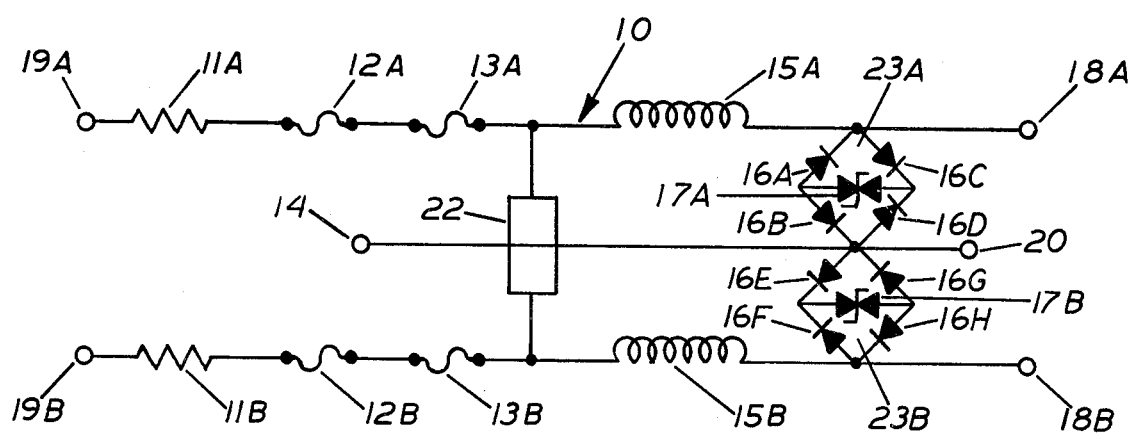

Referring now to the drawing wherein like legends and reference numerals, respectively, designate like or corresponding parts, and more particularly, to FIG. 1, the subject protection methods against short or extended duration over-voltages in any paired circuit. The flow through the protector network 10 is from input terminals 19A and 19B to the current-limiting resistor 11A, 11B, the low-voltage fuse 12A, 12B, the high-voltage fuse 13A, 13B, the resistive inductor 15A and 15B, and thence to the output terminals 18A and 18B, respectively. The protector reacts in this arrangement to slow rising or lower voltage over-voltages, to the instant over-voltage of any magnitude, and to any high voltage into the megawatt range, even if it remains applied to the circuit for hours. Diodes 16A, 16B, 16C and 16D form a first balanced bridge 23A and diodes 16E, 16F, 16G and 16H form a second balanced bridge 23B. One diagonal of each said bridge 23A and 23B is connected across ground and a line at a point of a line between the output terminal 18A, 18B and the near terminal of the resistive inductor 15A, 15B, respectively. An avalanche diode 17A and 17B, respectively, is connected across the other diagonal of the respective bridge 23A, 23B. This configuration will eliminate unwanted leakage to ground at low frequency and direct current conditions and eliminate a shunt capacity for the higher frequencies.

If a transient of low energy (a few joules) is applied to the circuit, avalanche diodes 17A and 17B will conduct above the voltage threshold and dissipate some energy, shunting some energy portion to ground, connected to the ground terminal 20; if it is a higher voltage transient, the dual chamber gas tube 22 will conduct and shunt the transient to its center terminal 14 which is connected to ground and hold the voltage to about 40 volts peak; the resistance and inductance of the resistive inductor 15 permits the voltage at terminals 18A and 18B to be maintained at a lower level where required. If a high energy surge is applied, the process will start as before, however, the dual chamber gas tube will conduct more current, for a longer period and cause the low voltage fuse 12A, 12B, to open circuit.

If a continuous or extended duration surge or over-voltage is applied, the sequence of events is similar to the above, except that the continuous conduction of the dual chamber gas tube 22 will cause low-voltage fuse 12A, 12B selectively, to open circuit, even if the over-voltage is slowly applied and only slightly above the critical voltage; this then eliminates the possibility of slowly "cooking" a sensitive circuit, or swamping it with a slight over-voltage. If a sustained high voltage is applied to the circuit, even in the multi-kilovolt range, the action is initiated as before through dual chamber gas tube 22 conduction. However, in this case fuse 12A, 12B respectively, is too slow and the high voltage fuse 13A, 13B, selectively, open circuits. The arc is instantly quenched, regardless of the voltage, because of construction methodology, which is illustrated by FIG. 2.

Figure 2:
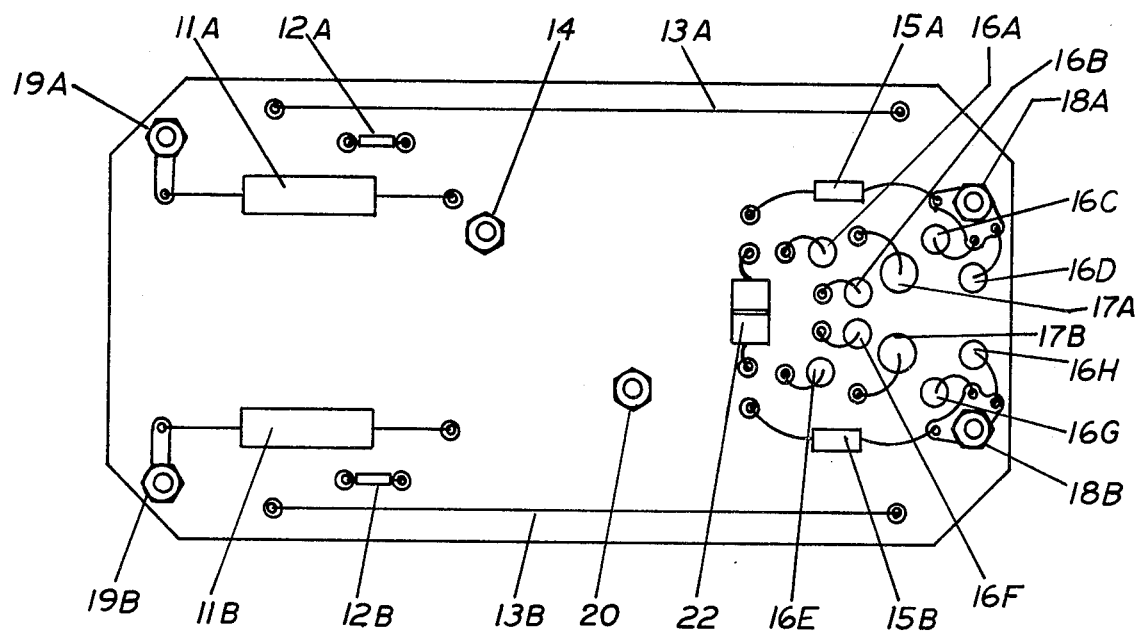
FIG. 2 is a plan view of one such physical embodiment of the protective circuit, illustrating, on a so-called circuit card, such an arrangement required to assure no compromise of the performance of the module in practice.

From FIG. 2 it is apparent that the construction technique is a part of this invention teaching. The low-voltage, sensitive and fast acting components, namely, the resistive inductors 15A, 15B, the diodes 16A through 16H, and the avalanche diodes 17A and 17B, are all grouped at one end of the circuit board 21 and adequately separated and spaced away from the hazardous energies end of said circuit board 21. The dual chamber gas tube 22 is at the interface; the high-voltage fuses 13A, 13B extends nearly the full length of the assembly, for about 14 centimeters, thus separating the hazardous area from the protecting components. All components related to the potentially hazardous area are grouped in the extreme left side of said circuit board 21.

Figure 3:
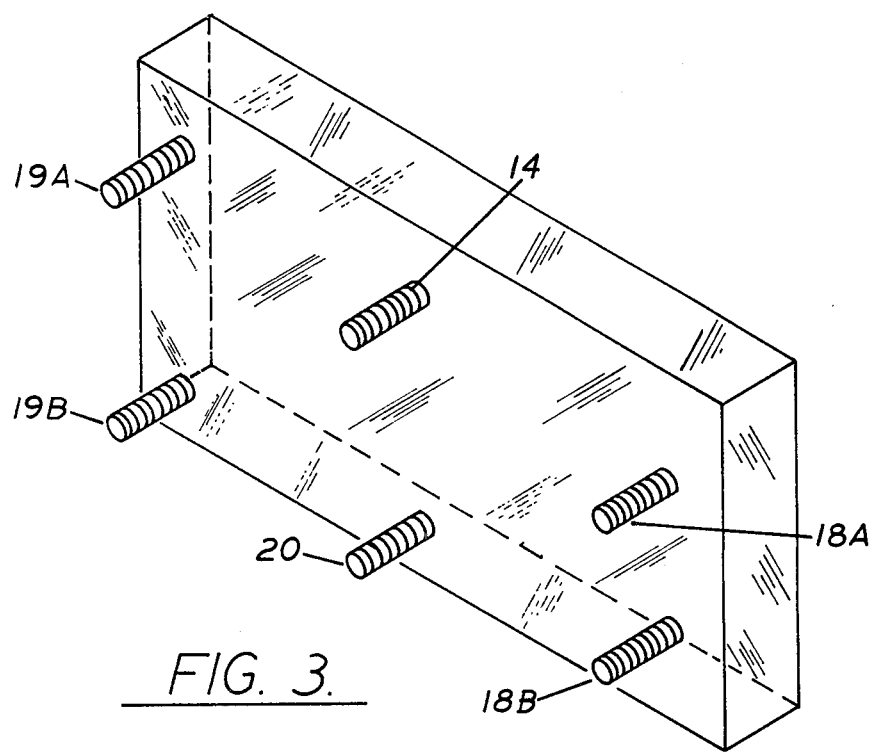
FIG. 3 is an isometric view of the encapsulated version of one such embodiment, presenting the completed modular concept for a single pair.

As an integral part of the teaching of this invention, FIG. 3 illustrates the production configuration of the completed module 31, after encapsulation. The completed assembly must be totally encapsulated with a flame retardant epoxy, such that no voids remain, particularly around the fuses 13A and 13B. This teaching is a key factor, since this factor in combination with the use of a very small cross-sectional area wire, about No. 30 AWG, forms the special high voltage fuse that opens circuits fast and quenches the arc instantly. This in addition to the combination of operations of the dual chamber gas tube 22 and the avalanche diodes 17A and 17B permits a very tight clamp with no overshoot voltage at the protected side in the vicinity of the terminals 18A and 18B.

Figure 4:
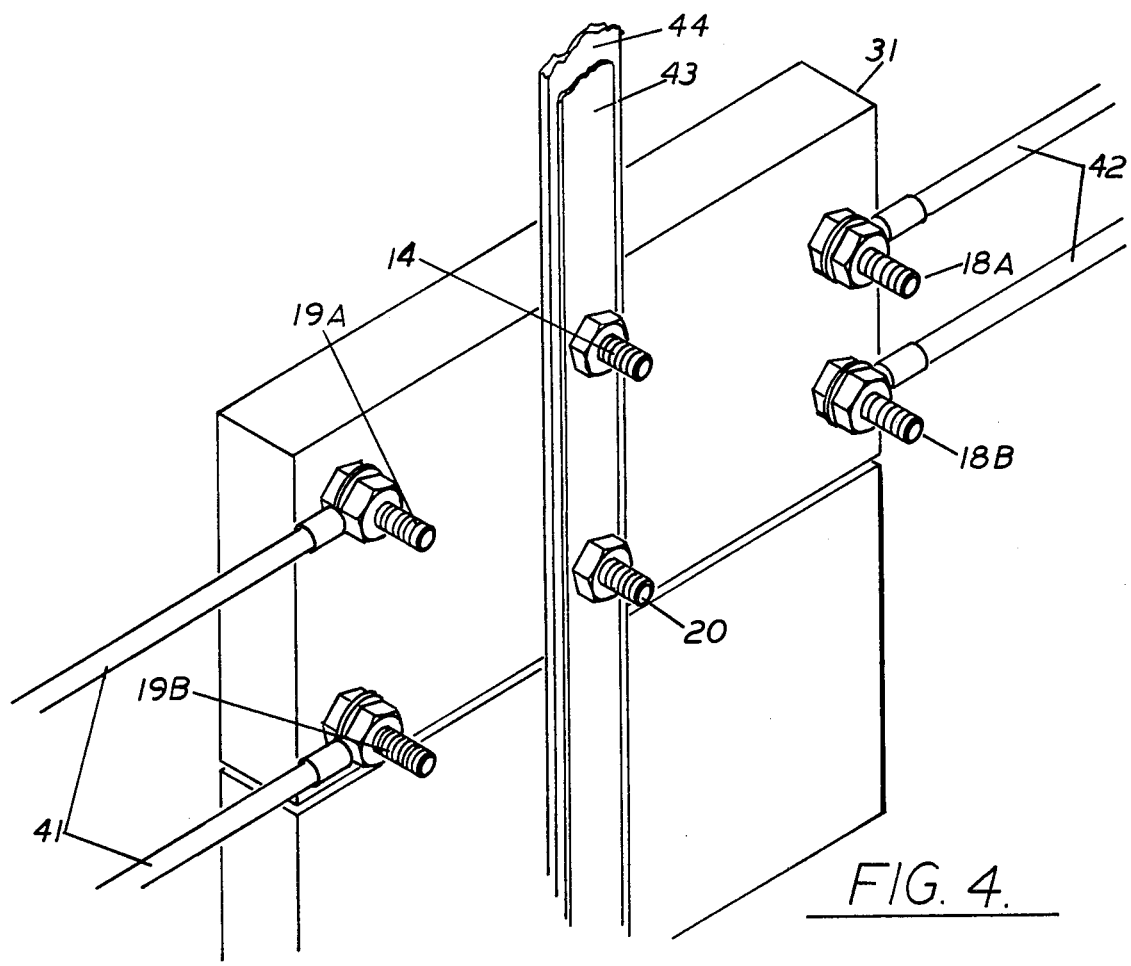
FIG. 4 is an isometric view of one such embodiment of that modular concept reflecting the recommended installation concept required to assure no coupling between input and output.

The teaching of FIG. 4 is also essential in that the performance of any protector where high voltages or high voltage transients are involved requires a substantial separation distance between the input wiring 41 and output wiring 42. These must be separated from each other by at least twice the length of the module 31. The ground connections 14 for and of the dual chamber gas tube 22 may be used for mounting to the frame 44, however, a low surge impedance conductor such as a large copper strap 43 must be used adjacent to the frame 44 to assure good grounding.

It is further feasible to obtain comparable effects of protection through combinations of the foregoing typical embodiments and methods and one of the foregoing concepts with third principles, without departing from the spirit of this invention.

What is claimed is:

1. Equipment for protecting electronic equipment and personnel against inadvertent occurrence of extended or transient voltages, having a first line equipped with an input and an output terminal, respectively, and a second line equipped with an input and an output terminal, respectively, for the connection between an incoming power source and the to be protected equipment, comprising:

a first input terminal,
   a first current-limiting resistor,
   a first low-voltage fuse,
   a first high-voltage fuse,
   a first resistive inductor,
   said first current-limiting resistor, said first low-voltage fuse, said first high-voltage fuse and that first resistive inductor connected in series and in this order between said first input terminal and said first output terminal of said first line,
   a second current-limiting resistor,
   a second low-voltage fuse,
   a second high-voltage fuse,
   a second resistive inductor,
   said second current-limiting resistor, said second low-voltage fuse, said second high-voltage fuse and said second resistive inductor connected in series and in this order between said second input terminal and said second output terminal of said second line,
   a dual chamber gas-filled tube having a first, a second, and a center terminal, connected across said first and said second line, said first terminal connected to said first line between said first high-voltage fuse and said first resistive inductor, said second terminal connected to said second line between said second high-voltage fuse and said second resistive inductor, said center terminal connected to a first terminal for connection to ground,
   four first diodes forming the arms of a first balanced bridge, one diagonal of which is connected across said first line and said first terminal to ground,
   a first avalanche diode forming the other diagonal of said first balanced bridge,
   four second diodes forming the arms of a second balanced bridge, one diagonal of which is connected across said second line and said first terminal to ground,
   a second avalanche diode forming the other diagonal of said second bridge.

2. Equipment as defined in claim 1, wherein each said high-voltage fuse consists of a wire having a discrete and small cross-sectional area, said wire being totally and hermetically encapsulated with a flame-retardant compound to provide rapid arc-quenching.

* * * * *